May 6, 1924.
P. J. MOOHAN
VEHICLE HOLDFAST
Filed June 14, 1923
1,492,575
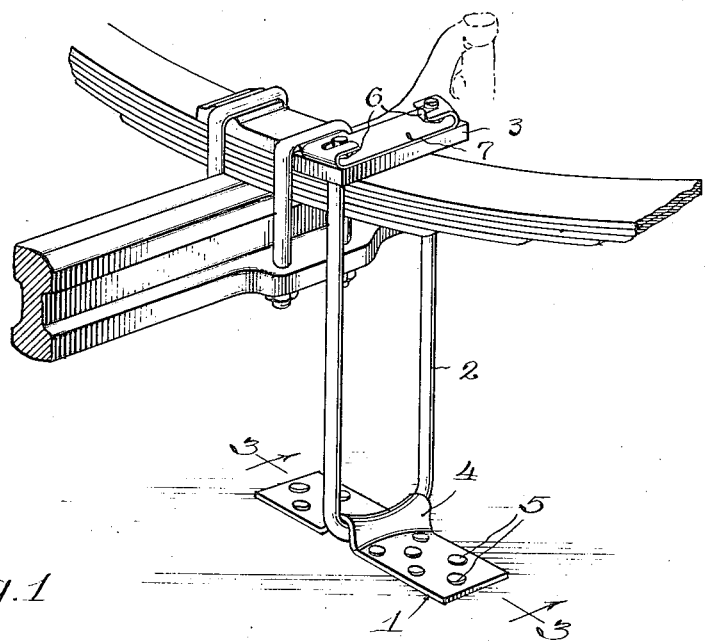
Fig.1
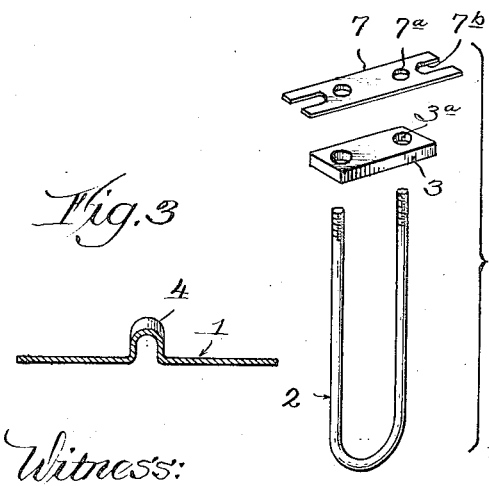
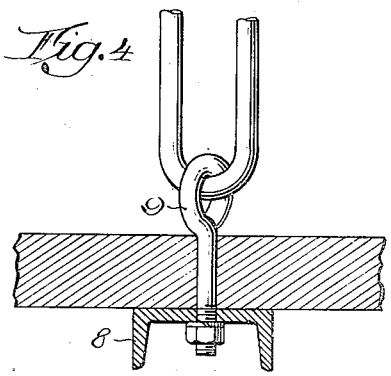
Inventor,
Patrick J. Moohan, Patented May 6, 1924.

1,492,575

UNITED STATES PATENT OFFICE.

PATRICK J. MOOHAN, OF KENOSHA, WISCONSIN.

VEHICLE HOLDFAST.

Application filed June 14, 1923. Serial No. 645,236.

*To all whom it may concern:*

Be it known that I, PATRICK J. MOOHAN, a citizen of the United States, and a resident of Kenosha, in the county of Kenosha and State of Wisconsin, have invented certain new and useful Improvements in Vehicle Holdfasts, of which the following is a specification.

This invention relates to improvements in vehicle hold-fasts, and more particularly to devices for anchoring wheeled vehicles in cars during shipment. Devices of this general character are extensively used for the purpose of anchoring the vehicles to the floor of the freight cars and against the jolting incident to freight transportation.

The objections to the devices commonly used are chiefly the lack of sufficient strength of parts and materials, as well as of proper design to withstand the strain placed upon them, and also the difficulty experienced in applying the devices within the car after the vehicles have been loaded.

The object of the present invention is, therefore, to eliminate the undesirable features attending the shipment of motor vehicles and to provide a substantial and dependable hold-fast which may be readily and securely fastened to the car floor and the vehicle anchored thereto with equal security against displacement during transit.

A preferred embodiment of the invention is disclosed in the drawings, wherein—

Figure 1 is a perspective view showing the general disposition of the hold-fast with respect to the vehicle, Figure 2 is a disassembled perspective view of the principal parts constituting the device, Figure 3 is a detail view in longitudinal section of the floor plate, taken on line 3, 3 of Figure 1, and Figure 4 is a modification of the device as installed in a car as standard equipment.

It is to be explained at the outset that in the fastening of a motor vehicle within a freight car four of the devices would be used, one being located adjacent each of the wheels and preferably secured or passing around the springs just forwardly and rearwardly of the front and rear axles respectively, as clearly shown in Figure 1. In addition to the hold-fasts, wedge blocks are usually inserted and secured to the car floor in front and rear of each wheel and serve to hold the vehicle from rolling.

The hold-fast consists in general of a floor plate or clip 1, adapted to be nailed or otherwise secured to the car floor, and a U-shaped arm or U-frame 2 pivotally connected at its lower end with the floor plate and carrying at its upper end a cross bar 3 with suitable locking means hereinafter described in detail.

The floor plate consists of an elongated plate or strip of sheet metal bent or shaped at its central portion to provide a transversely extending loop or eye 4 of inverted U-shape in cross-section, as well as curved or rounded in transverse section, giving it a saddle shape. The end portions are flat and provided with a plurality of holes therein through which nails 5 are driven into the floor of the car.

The arm 2 consists of a rod or length of round stock bent in U-shape and having an over-all length substantially equal to the distance from the floor of the car to the springs of the vehicle. The ends of the two parallel branches of the arm 2 are threaded to take nuts 6, 6 for securing the cross bar 3 in place.

Further details of the device may best be brought out in a discussion of the operation of making a vehicle fast within a car. The first step is to locate or "spot" the vehicle within the car. This can be done by means of a simple form of frame or jig so marked as to define the location of each of the hold-fasts. The workman can then nail down the floor plates before the vehicle or vehicles are loaded, thus eliminating any possibility of striking the vehicle and marring the finished surface, as often occurs when anchoring devices are applied after the vehicle has been loaded. Having secured the floor plates in position the U-shaped arm with cross plate and nuts removed is applied to the floor plate by passing one end through the eye 4 thereof so that the rounded end portion engages the eye. It will be observed that the plates are nailed down so that they extend lengthwise with respect to the vehicles and directly beneath the springs substantially parallel therewith. Having applied the arms, the same can be turned down so as to lie flat upon the floor to permit the vehicle to be loaded and rolled to its proper position. Then the four arms are raised to a vertical position with the end portions straddling the springs at points adjacent the axles, and preferably at the distant sides thereof. The threaded ends of the U-frame project above the top of the springs thus permitting the cross bar 3 to be inserted upon the threaded ends in contact with the spring. The cross bar is a flat bar of metal having holes 3ª at its ends, to register with the ends of the arm 2. While the nuts 6, 6 are used for securing the cross bar against the spring, it is preferred to use a locking plate 7 in conjunction therewith. The locking plate is a relatively thin strip of metal somewhat longer than the cross bar and having holes 7ª disposed inwardly from the ends thereof, these holes corresponding to and registering with the holes in said cross bar. At the ends of the locking plate are formed slots 7ᵇ, 7ᵇ, extending inwardly a short distance from the holes and in longitudinal alinement therewith. The width of the slots is slightly greater than the diameter of the ends of the U-frame.

As before suggested, the cross plate is applied and immediately on top is placed the locking plate. The nuts are then screwed down tightly, thus firmly anchoring the vehicle to the floor. As the final step, the ends of the locking strip are bent upwardly and doubled back so that the threaded ends of the U-frame are straddled by the slotted ends of the locking plates. This securely locks the nuts against rotation and prevents the same from becoming unscrewed during transit. The locking plate, being thin and relatively soft, can be readily bent over by means of pliers, and as easily straightened, to unlock the nuts when the vehicle reaches its destination.

Any slight movement of the vehicle after the fastening of the hold-fast and application of the wedge blocks under the wheels is permitted by the pivotal connection between the floor plates and the U-shaped arms 2. Moreover, the curvilinear contour of the eye 4 and base portion of the arm affords ample opportunity for any lateral adjustment that may be necessary in order that the parts may find their final positions as the tension is applied by the tightening of the nuts, thus avoiding any undue strain or unequal stresses in the device.

As a modification of the device already described, it is conceived that anchoring devices of this character may be readily provided for by the car builders. To this end a plurality of holes may be bored through the car floor (Figure 4) and in alinement with holes drilled in the transverse frame members 8 beneath the car floor. These holes would then be used to anchor eye bolts 9 by means of nuts 10 applied from the under side. Manifestly the eye bolts may be a part of the car, with the provision of additional holes for shifting them to the desired locations. The U-shaped arms, preferably supplied by the shipper, would be utilized as before described in the anchoring of the vehicle to the floor.

Having described a preferred form of the device embodying the invention, and the manner in which it may be used, I claim—

1. A vehicle hold-fast comprising a fixed member adapted to be secured to the floor of a car and having an eye, a U-shaped arm adapted to removably engage said eye and to straddle a part of a vehicle between its free ends, and means for securing said arm to the vehicle.

2. A vehicle hold-fast comprising an anchor member adapted to be fastened to a predetermined point to the floor of a car and provided with an eye, a U-shaped arm adapted to be removably inserted through the eye of said anchor member and to straddle a part of the vehicle immediately above said anchor member, and a cross bar connecting the free ends of said arm.

3. A hold-fast for the purpose described comprising a floor plate having a straddle shaped eye, an arm consisting of a rod bent in U-shape and adapted to be inserted through said eye and to straddle an under part of the vehicle between its free ends, a cross bar engaging the free ends of said arm above the part engaged thereby, nuts mounted at said free ends, and a locking member for said nuts.

4. A vehicle hold-fast comprising a floor plate having a central transverse eye formed in saddle shape, a U-shaped arm pivotally engaging said plate at its rounded end and to straddle a part of the vehicle above said plate between its free ends, a cross bar having end openings to engage said free ends and to extend over the straddled part of the vehicle, a locking member adapted to be applied over said cross bar and consisting of a metal strip having projecting end portions provided with endwise opening slots, and nuts adapted to be applied to the free ends of said arm, the end portions of said locking member being adapted to be bent substantially double with said slots straddling said ends of the arms above said nuts.

5. A vehicle hold-fast comprising an eye member adapted to be secured to the floor of a car, an arm consisting of a rod bent in U-shape and having threaded end portions to receive nuts, said arm being adapted to be inserted through the eye member and to straddle a part of the vehicle between its free ends, a cross bar drilled to be applied over the threaded ends of said arm, a locking strip adapted to be applied over said cross bar and having slotted portions adapted to be bent over upon said nuts when applied and to straddle the extremities of said threaded end portions to lock said nuts.

In witness whereof, I hereunto subscribe my name this 8th day of June, A. D., 1923.

PATRICK J. MOOHAN.